United States Patent [19]
Axelsson

[11] Patent Number: 6,110,371
[45] Date of Patent: Aug. 29, 2000

[54] PROCESS AND DEVICE FOR FAT SEPARATION

[75] Inventor: Niklas Wilhelm Axelsson, Vaxholm, Sweden

[73] Assignee: Sciencia Biotech AB, Täby, Sweden

[21] Appl. No.: 09/155,084

[22] PCT Filed: Mar. 21, 1997

[86] PCT No.: PCT/SE97/00486

§ 371 Date: Sep. 18, 1998

§ 102(e) Date: Sep. 18, 1998

[87] PCT Pub. No.: WO97/34840

PCT Pub. Date: Sep. 25, 1997

[30] Foreign Application Priority Data

Mar. 21, 1996 [SE] Sweden .................................. 9601090

[51] Int. Cl.[7] .................................................. C02F 1/40
[52] U.S. Cl. .......................... 210/608; 210/610; 210/220; 210/540; 210/614; 210/620
[58] Field of Search .................... 210/608, 610, 210/611, 615, 619, 750, 151, 209, 220, 538, 540, 614, 743, 620

[56] References Cited

U.S. PATENT DOCUMENTS

| | | |
|---|---|---|
| 4,126,545 | 11/1978 | Hagiwara .................................. 210/619 |
| 4,510,243 | 4/1985 | Haga et al. .............................. 210/614 |
| 4,810,385 | 3/1989 | Hater et al. ............................. 210/611 |
| 4,925,564 | 5/1990 | Francis .................................... 210/610 |
| 4,940,539 | 7/1990 | Weber ..................................... 210/538 |
| 4,940,544 | 7/1990 | Gode et al. ............................. 210/608 |
| 4,983,284 | 1/1991 | Batten ..................................... 210/538 |
| 5,516,687 | 5/1996 | Perez et al. ............................ 210/608 |
| 5,567,314 | 10/1996 | Chigusa et al. ........................ 210/150 |

FOREIGN PATENT DOCUMENTS

| | | |
|---|---|---|
| 0546881 | 6/1993 | European Pat. Off. . |
| 2659645 | 9/1991 | France . |
| 2708923 | 2/1995 | France . |

*Primary Examiner*—Christopher Upton
*Attorney, Agent, or Firm*—Pennie & Edmonds LLP

[57] ABSTRACT

Process and equipment for fat separation in waste water from restaurants, bakeries, food processing industries etc. The fat-containing waste water is treated in a fat separator by the addition of a liquid microbe culture that degrades proteins, starch etc. and converts the fat to fatty acids. In a preferred embodiment of the invention the fatty acids are recovered with the aid of a so-called skimmer.

19 Claims, 1 Drawing Sheet

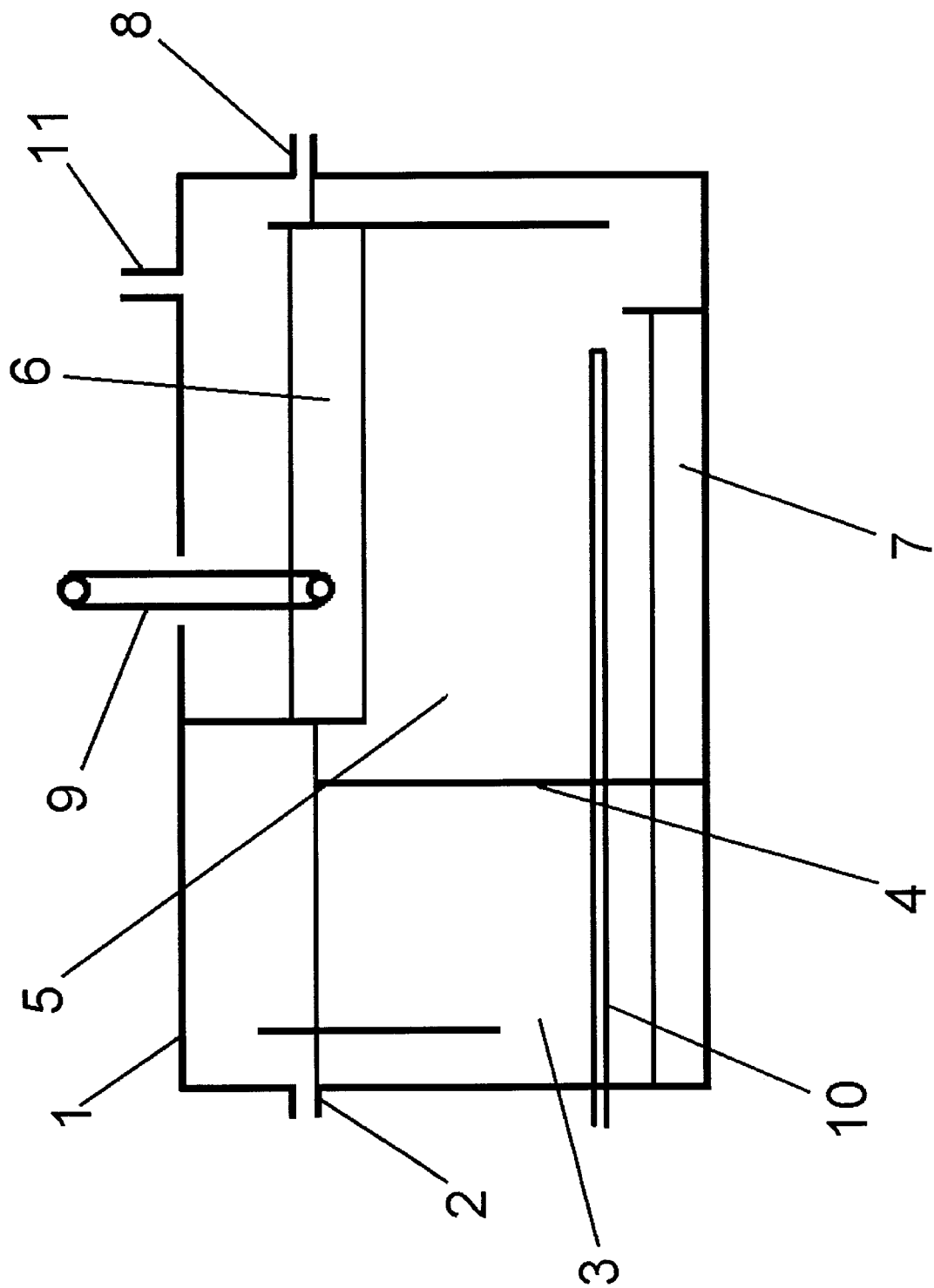

PROCESS AND DEVICE FOR FAT SEPARATION

BACKGROUND ART

Waste water from restaurants, bakeries, food processing industries etc. contain much fat. The fat, which at first is of low viscosity and often emulsified, becomes separated and solidifies, when the waste water gets cold. The solidified fat often causes stoppage in the sewers. Most municipalities with municipal sewage nets, receiving waste water from restaurants and food processing industries, with high fat content in the waste water, are therefore limiting the fat concentration in the waste water and demand installation of fat separators to maintain the limit.

Beside fat the waste water contains several other substances in dissolved or suspended form as surfactants and alkali from cleaning agents, starch, proteins and fibres from food rests etc. In the fat separator the fat is separated as a solid comparatively hard cake contaminated with other substances. When the fat separator's space for fat is full, it has to be emptied. Before emptying, the fat cake has to be broken up. More often than not it happens that this breaking up does not became good enough to allow all fat to be eliminated. Remaining fat pieces follow the waste water and gather in the parts of the sewer where the current is weak, and form with other contaminants stoppages, causing at least as large problems as the fat stoppages mentioned.

The separated fat contains large amounts of both unsaponified and saponified fat. Such a mixture is very unfavourable from the reworking point of view especially as the reworking is disturbed by the contaminants mentioned. Usually the separated fat has to be disposed of.

Many trials have been done to decompose the fat, to be more easily handled, by using enzymes and several other chemicals. The decomposition products, which are soluble or form stabile dispersions in water, do not cause problems in the sewer and give no problems in the sewage works. Exceptions from this rule are fatty acids, which are said to cause growth of so called filiform bacteria, which may cause sludge swelling and sludge escape. The success with enzymes has been limited. Chemicals of other kinds are often causing problems in the conduits and in the sewage works.

Trials with living bacteria cultures have been more successful. Especially have cultures with a broad spectrum of starch degrading, protein degrading and fat degrading bacteria shown good results. European patent application No. 0 546 881, French patent application No. 2 659 645 and French patent application No. 2 708 923 treat some different aspects of this technique. Of those publications EP 0 546 881 and FR 2 708 923 relates to the treatment of fat in the diluted form that is found in waste water, while FR 2 695 645 relates to fat that has been separated from waste water by flotation.

According to all these publications the ultimate objective is complete decomposition of fat to water, carbon dioxide and biomass. In any cases one neglects the fact that the fatty acid part of the fat is an industrially useful raw material, with a substantial market value, if it can be recovered in an acceptably pure form.

Microorganisms with the capacity to split proteins, starch and fat are not found among bacteria, only, but also among fungi, for instance. Often fungus cultures can be superior to bacteria cultures. For instance, fungus cultures are characterised by higher tolerance for toxins and have higher reaction rates. In a preferred embodiment of this invention the microbe culture consists at least in part of fungus culture.

The growth conditions for microorganisms in a fat separator are not optimal. The capacity to reproduce under given circumstances differs between different microbe species. Thus, occasional additions do not suffice to maintain a well-balanced composition in the microbe culture. Repeated additions are necessary. Earlier these additions have been made at the inlet of the fat separator.

SUMMARY OF THE INVENTION

Surprisingly it has now been found out that addition along the fat separator give much better results. I.e. that the same degradation is obtained with less addition of microbe culture or that the same addition of microbe culture gives more thorough degradation.

The explanation is probably a combination of the known fact that microorganisms suitable for biological degradation of fat, to exercise optimal action, need solid surfaces to stick to and that the insets usually proposed, see for instance the publications mentioned, serve as a filter, which prevents the addition of microbe culture to spread along the separator. If the addition is done at the surface and combined with aeration from below spreading downwards in the separator is obstructed. Thus, one runs the risk of getting optimal composition of microbes in the surface layer in the area close by the addition point, only.

The problem becomes especially acute if, for instance, active chlor or other substances that inhibit the biological activity happen to get into the system. These inhibiting substances develop their full activity close by the addition point and may easily knock out the most active parts of the biological degrading system. Addition at the inlet, only, delays establishment of new optimally active microorganism colonies in the entire separator.

This invention relates to a process where the addition of a liquid microbe culture is done by injection in an intermediate layer situated over the sludge layer and below the floating fat layer, through a pipe system, which extends to almost the whole length of the separator (at least two thirds).

The addition should not be uniform along the separator. A distribution with 10 to 20% in the first third, 50 to 70% in the second third and 20 to 30% in the last third has turned up as very suitable. This observation concerns a prototype plant. Results from other plants with differing production conditions do not necessarily coincide. Thus, optimal distribution between different parts of the fat separator should be determined in each specific case.

The result of the distributed addition of microbe culture mentioned can be further improved by aeration the separator. The air may be added by the same pipe system as the microbe culture, but the use of separate systems is often suitable. This is especially the case when the aeration is combined with additives to maintain correct pH and when the air beside the aeration serves to drive mobile, surface increasing insets.

Aeration is done firsthand during periods when no waste water is added to or leaves the separator. A few hours during night may be appropriate. A combination of aeration giving extremely fine bubbles dissolving in water and larger bubbles giving more vigorous agitation may be appropriate.

Further the invention relates to a special design of a fat separator, which in principle may be useful for use without microbe culture, too, but firsthand is intended for use with microbe culture according to this process.

Further the invention relates to a pipe system and other necessary additions to be used at conversion of existing fat separators to make it possible to use a microbe culture according to this invention optimally.

BRIEF DESCRIPTION OF DRAWINGS

FIG. 1 is a schematic drawing which illustrates the principles of the fat separator of the invention.

DETAILED DESCRIPTION OF THE INVENTION

Microorganisms suitable for treatment of fat in fat separator and waste water systems have their origin from microbes that have been found sticking to stones and other water-covered surfaces in riverbeds. To be active they depend upon suitable surfaces to stick to. Thus, the separator should be provided with insets giving suitable surfaces besides the walls for microbes to stick to. The walls and the insets should be rough to increase the surface available to the microbes.

The surface increasing insets should have an open structure and a minimum of horizontal surfaces directed upwards to let dead, i.e. no longer active biomass sediment unobstructed to join the sludge layer. Sacks or baskets filled with supporting bodies as is proposed in several older publications are not suitable, as spaces between the bodies may easily be filled with inactive biomass.

It is an advantage if the insets for increasing available surfaces are mobile. The mobility decreases the risk for establishment of local anaerobe zones, which can produce hydrogen sulphide and other substances, which are ill-smelling and inhibit aerobe biological activity. Examples of suitable designs of mobile insets are treated below.

Fat separators placed near the place where the waste water is produced get as a rule irregular loads. Occasions with a high load shift with occasions when no waste water is added to the separator. The changes are usually very sudden. The biomass is dependent upon permanent supply of nutriment to survive. Thus the separator should be provided with devices for adding nutrient solution when waste water is not added. The addition may, for instance, be time controlled and switched in by a sensor in the supply pipe for waste water. The addition of nutrient solution is especially important when fungus cultures are used as their high reaction rate rapidly may lead to nutrient shortage in the separator.

Acid-resistant steel and fibre-reinforced plastic are usually considered as suitable material for fat separators. Microbes thrive better at plastic surfaces than at acid acid-resistant steel. Fibre-reinforced plastic is preferred. When converting existing separators acid-resistant steel may be unavoidable. As the toxicity of the material is limited to the surface, it is compensated to large extent by the insets of suitable material mentioned. When suitable the toxicity of the acid-resistant steel may be eliminated by spraying with a suitable plastic. Another suitable material may be steel covered with plastic.

Microorganisms suitable for fat elimination are sensible for as well high as low pH. Optimal activity conditions can be found in the pH-range 6.5 to 8.5. Waste water from dish washing machines and other cleaning in restaurants and food processing industries often contains an alkali hydroxide. Surplus of fat and other reactive substances react fast with the alkali. At the inlet to the fat separator pH is seldom higher than 8 to 9. Thus, inlet-pH may be too high for optimal activity. However, a larger problem is that acids are let free, inter alia, caused by the microbial activity and that pH therefore rapidly sinks to less than 6 and thus under the level suitable for optimal activity. pH-control and pH-stabilisation are suitable. Glass electrodes may be used, but put high demands on supervising and cleaning. Measurement of conducting capacity can be used as a satisfactory alternative, after calibrations for each separate plant, and exhibits substantially fewer maintenance problems. Dosing devices governed by pH-control and adapted for suitable pH-stabilising chemicals should be installed.

Stabilising can be done by using suitable buffer salts, especially bicarbonate and mono- respectively dihydrogen-phosphate. Stabilising of pH with the aid of phosphates, especially ortophosphates, is preferred.

Another economically more advantageous alternative is to use a calcium carbonate, for instance as a slurry of chalk and/or marble flour.

Still another alternative that, beside pH-adjusting activity, improves the growth conditions for the microbe species is to add small amounts of ammonia to the air used for the oxygenation. The substrates for the microbes show low levels of available nitrogen and therefore the growth of biomass becomes better if ammonia is added. The addition may be done from a pressure container and be controlled by a suitably designed magnetic valve.

Beside the sensitivity for high and low pH the microbes are very sensitive to active chlor. Thus, the use of chlor containing cleaning agents must be avoided.

Very small amounts of culture are needed to start the degradation. At the start up after emptying or after that the microbe culture has been knocked out from one or other reason for instance 500 ml per day of a microbe culture that contains 0,125 g microbes per liter during two weeks are added. Later the amount is reduced to 250 ml per day. This example relates to a prototype plant in a middle size restaurant. In other plants those values will, of course, be different. As a rule the principle of higher start levels and lower upkeep levels will probably be true for other installations, too.

Optimal temperature for the microbes lies within the range 32 to 37° C. Fat separators are usually placed at low-temperature surroundings and some isolation of the tank may be suitable. Measures may be needed to prevent hot waste water from increasing the temperature too much temporarily. If the temperature in the surroundings of the separator is too low means for warm-keeping, for instance with the aid of electricity, should be installed.

As surface increasing insets, for instance, rotating uprights may be used. The driving may be done by propellers driven by the blowing-in of air. A suitable number of uprights may be placed on a rotating carrier. Each individual upright may rotate independently of the others. At the uprights horizontal, star-shaped or in other way multi-lobate elements of suitable material for microbe adhering. Another very suitable design of the uprights may be like ordinary round lavatory brushes.

Under the action of a suitable microbe culture starch and proteins are degraded and the fat converted from glycerine esters to fatty acids. Some shortening of the carbon chain may also occur. The fatty acids form a floating layer almost free from contaminants uppermost in the separator. Pure fatty acids, with the chain lengths that, inter alia, exist in cooking fat, are valuable raw materials and are here present in an almost pure form. Thus, equipping the fat separator with devices for recovering of the fatty acids is preferable. Such devices are comparatively simple and can consist of overflow channels or mechanical arrangements of type "skimmer". The latter device is preferred, as fatty acids from a suitably designed skimmer become purer than from a channel. An especially preferred skimmer consists of an upper driving bobbin and a lower idle bobbin and over these bobbins a steel band with raking arrangements.

Microbe cultures, possibly with aeration, eliminate almost totally the unpleasant smell that usually occurs in fat separators of different kinds. Common fat separators usually require very expensive ventilation ducts up to and above the roof of the building. For this new type of fat separators the ventilation air can be let out at the fat separator level without smelling problems. Usually the need for ventilation during operation can be satisfied by the waste water pipe. In such cases opening possibilities are necessary at emptying the separator only.

A fat separator for use at the process of the invention consists of a tank made of suitable material. The length of the tank should be larger than its width. It is advantageous if the tank is divided into 2 to 3 partitions by transverse walls. The walls do not reach up to the whole liquid level in the tank. In the first partition counted from the inlet heavy sludge is sedimented, in the following part suspended organic material is degraded and fat separated.

In a fat separator with microbe culture according to the invention the fat is isolated mostly as fatty acids, which accumulate to a floating layer in the upper part of the tank. The fatty acids may easily be removed with the aid of skimmers or overflow channels. Continuous removal of the fatty acids is preferred, as this prevents that they are under influence of oxidation and similar processes that diminish their commercial value during longer time.

Analyses of skimmed products show fatty acid contents above 90 weight %. The skimmed product may without further purification be used as raw material for a potassium soap with very good qualities as washing and cleaning agent. Several other uses are possible. The part of the fat that can be recovered with the aid of a skimmer is the main part of the fat that, according to analyses and calculations, can be found in the waste water. The amount of fat is often substantial and may be 50 kg per day or more. As the fat can be recovered in a commercially useful form while the costs of emptying the fat separator are reduced substantially installation of a skimmer or similar equipment is economically advantageous.

At the bottom of the fat separator sludge is accumulated. This sludge consists partly of not degraded components in the waste water partly of cell walls etc. from dead microbes. The sludge will be fairly fluffy and have high water content. To reduce the sludge volume and increase its dry matter content additions of polymers especially cationic polymers, may be suitable.

The tank may be parallellepipedical or more or less cylindrical. If the tank is equipped with sludge collection pockets with downward outlets, beside the skimmer, the need for expensive sludge suction can be reduced.

FIG. 1 shows in rough strokes the principle of a fat separator of this invention.

In the FIG. (1) stands for the tank, (2) for the inlet to the separator, (3) for the heavy sludge zone, (4) for a partition wall separating the heavy sludge zone from the water zone (5), (6) for the fat zone, (7) for the sludge zone, (8) stands for the outlet for waste water, (9) for a skimmer that continuously or intermittent removes fat and fatty acids. (10) is a pipe system that distributes liquid microbe culture along the separator and (11) is a ventilation opening closed during operation but opened when emptying to avoid negative pressure. The skimmer may be built in to correspond to regulations that do not allow outlets in the near surroundings.

What is claimed is:

1. A fat separator for separating fat from waste water, the fat separator comprising:
    a vessel for containing the waste water having a bottom and a length;
    an inlet arranged to receive a fat-containing waste water;
    at least one partition that extends vertically from the bottom so as to provide at least two chambers in the vessel;
    a pipe system extending into and along at least two-thirds the length of the vessel for injecting a liquid microbe culture into the fat-containing waster water to degrade a portion of the fat to provide treated water and at least one fatty acid; and
    an outlet arranged to remove the treated water, wherein the pipe system has a first third, second third, and last third and permits distribution of the liquid microbe culture along substantially the entire pipe system and permits distribution of a majority of the liquid microbe culture from the second third of the pipe system.

2. The fat separator of claim 1 further comprising a skimmer for removing at least a portion of the at least one fatty acid.

3. The fat separator of claim 1 further comprising at least one device for measuring the pH of the fat containing water and a system for adding pH modifying chemicals to the fat containing water.

4. The fat separator of claim 3 wherein the device for measuring the pH comprises at least one glass electrode.

5. The fat separator of claim 4 wherein the pH modifying chemicals comprise at least one chemical selected from the group of ammonia, a suitable buffer salt of a carbonate, a suitable buffer salt of a phosphate, and a combination thereof.

6. The fat separator of claim 1 further comprising a system for adding a nutrient solution for the liquid microbe culture.

7. The fat separator of claim 1 further comprising a system to aerate the fat-containing waste water.

8. The fat separator of claim 7 wherein the system for aerating the fat-containing waste water comprises a pipe system.

9. The fat separator of claim 8 wherein the system for aerating further comprises air, ammonia, or a combination thereof.

10. The fat separator of claim 1 wherein the fat separator comprises acid resistant steel, steel covered with plastic, fiber-reinforced plastic, or a combination thereof.

11. A process for separating fat comprising:
    providing a sludge-and fat-containing waste water to a treatment zone; and
    injecting a liquid microbe culture from an injection zone that extends along at least two thirds of the treatment zone into the fat-containing waste water so as to treat the fat-containing waste water to provide treated water and at least one fatty acid, wherein a majority of the liquid microbe culture is injected from a middle third of the injection zone.

12. The process of claim 11 wherein the process further comprises separating a portion of the sludge and fat from the fat-containing waste water before injecting the liquid microbe culture.

13. The process of claim 12 wherein the process further comprises removing the at least one fatty acid from the treatment zone.

14. The process of claim 12 wherein the process further comprises measuring the pH of the fat-containing water.

15. The process of claim 12 wherein the process further comprises adding pH modifying chemicals to the fat-containing waste water to modify the pH of the fat-containing waste water.

16. The process of claim 15 wherein the pH modifying chemicals comprise at least one chemical selected from the group of ammonia, a suitable buffer salt of a carbonate, a suitable buffer salt of a phosphate, and a combination thereof.

17. The process of claim 12 wherein the process further comprises adding a nutrient solution for the liquid microbe culture.

18. The process of claim 12 wherein the process further comprises aerating the fat-containing waste water.

19. The process of claim 18 wherein the aeration step further comprises air, ammonia, or a combination thereof.

* * * * *

UNITED STATES PATENT AND TRADEMARK OFFICE
CERTIFICATE OF CORRECTION

PATENT NO. : 6,110,371
DATED : August 29, 2000
INVENTOR(S) : Axelsson

Page 1 of 1

It is certified that error appears in the above-identified patent and that said Letters Patent is hereby corrected as shown below:

Column 6, line 63: change "claim 12" to --claim 11--.

Column 6, line 66: change "claim 12" to --claim 11--.

Column 7, line 1: change "claim 12" to --claim 11--.

Column 8, line 1: change "claim 12" to --claim 11--.

Column 8, line 4: change "claim 12" to --claim 11--.

Signed and Sealed this

Thirty-first Day of July, 2001

*Attest:*

Nicholas P. Godici

*Attesting Officer*

NICHOLAS P. GODICI
*Acting Director of the United States Patent and Trademark Office*